US011906973B2

(12) United States Patent
Yoo et al.

(10) Patent No.: US 11,906,973 B2
(45) Date of Patent: Feb. 20, 2024

(54) ELECTRONIC DEVICE AND METHOD FOR CONTROLLING ROBOT

(71) Applicant: Samsung Electronics Co., Ltd., Gyeonggi-do (KR)

(72) Inventors: Jinseon Yoo, Gyeonggi-do (KR); Harkjoon Kim, Gyeonggi-do (KR); Sungbin Kuk, Gyeonggi-do (KR); Jimin Kim, Gyeonggi-do (KR); Eunjoo Mo, Gyeonggi-do (KR); Chiyoung Ahn, Gyeonggi-do (KR); Heeyoung Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 310 days.

(21) Appl. No.: 17/149,416

(22) Filed: Jan. 14, 2021

(65) Prior Publication Data
US 2021/0223784 A1    Jul. 22, 2021

(30) Foreign Application Priority Data

Jan. 21, 2020   (KR) ........................ 10-2020-0007681

(51) Int. Cl.
*G06F 3/048*    (2013.01)
*G05D 1/00*    (2006.01)
(Continued)

(52) U.S. Cl.
CPC ......... *G05D 1/0234* (2013.01); *G05D 1/0016* (2013.01); *G06F 3/04847* (2013.01);
(Continued)

(58) Field of Classification Search
CPC ............... G05D 1/0234; G05D 1/0016; G05D 2201/0203; G05D 1/0033; G06F 3/04847;
(Continued)

(56) References Cited

U.S. PATENT DOCUMENTS 8,332,067 B2   12/2012 Ditscher et al.
10,217,285 B2   2/2019 Smith
(Continued)

FOREIGN PATENT DOCUMENTS

JP    2012-171024    9/2012
JP    5911933    4/2016
(Continued)

OTHER PUBLICATIONS

International Search Report dated Apr. 1, 2021 issued in counterpart application No. PCT/KR2020/019442, 7 pages.

*Primary Examiner* — Aleksey Olshannikov
(74) *Attorney, Agent, or Firm* — The Farrell Law Firm, P.C.

(57) ABSTRACT

An electronic device and method for controlling a robot is provided. The electronic device includes a wireless communication unit, a camera, a touch display, a memory, and a processor configured to be operatively connected to the wireless communication unit, the camera, the touch display, and the memory. The processor is configured to recognize a marker of the robot photographed using the camera; generate an indicator indicating a space around the recognized robot; acquire location information for moving the robot to an area within the indicator by using the touch display; and transmit the acquired location information to the robot to move the robot to a location corresponding to the acquired location information.

17 Claims, 16 Drawing Sheets

(51) Int. Cl.
*G06T 7/70* (2017.01)
*G06F 3/04847* (2022.01)
*G06T 19/00* (2011.01)

(52) U.S. Cl.
CPC .............. *G06T 7/70* (2017.01); *G06T 19/006* (2013.01); *G06T 2207/30204* (2013.01)

(58) Field of Classification Search
CPC ..... G06F 3/04815; G06F 3/0488; G06T 7/70; G06T 19/006; G06T 2207/30204; G06T 19/20; G06T 2200/24; G06T 2219/2016; G05B 2219/40099; B25J 9/1697; B25J 11/008; B25J 9/161; B25J 9/1664; B25J 13/06
See application file for complete search history.

(56) References Cited

U.S. PATENT DOCUMENTS

| | | | |
|---|---|---|---|
| 2011/0138416 A1 | 6/2011 | Kang et al. | |
| 2014/0207286 A1* | 7/2014 | Wang | G05D 1/0038 901/1 |
| 2016/0075025 A1 | 3/2016 | Maeda | |
| 2017/0197146 A1 | 7/2017 | Miller | |
| 2018/0055326 A1 | 3/2018 | Jung | |
| 2018/0061137 A1* | 3/2018 | Jung | G05D 1/0044 |
| 2019/0114798 A1* | 4/2019 | Afrouzi | G05D 1/0088 |
| 2022/0066456 A1* | 3/2022 | Ebrahimi Afrouzi | A47L 9/2873 |
| 2022/0095872 A1* | 3/2022 | Bassa | G06V 10/82 |

FOREIGN PATENT DOCUMENTS

| | | |
|---|---|---|
| KR | 2011-0117492 | 10/2011 |
| KR | 2011-0117496 | 10/2011 |
| KR | 10-1471852 | 12/2014 |
| KR | 1020160022856 | 3/2016 |
| KR | 10-1704193 | 2/2017 |
| KR | 2017-0103556 | 9/2017 |
| KR | 1020180024429 | 3/2018 |
| KR | 2018-0033920 | 4/2018 |
| WO | WO 2019/186551 | 10/2019 |

* cited by examiner

FIG. 9
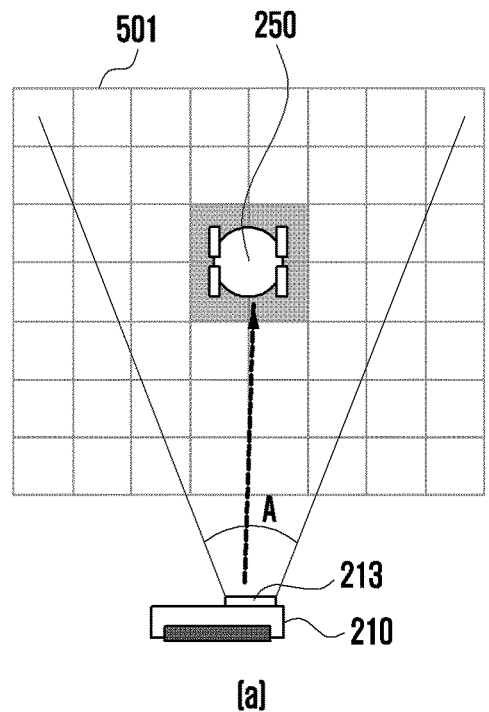
(a)
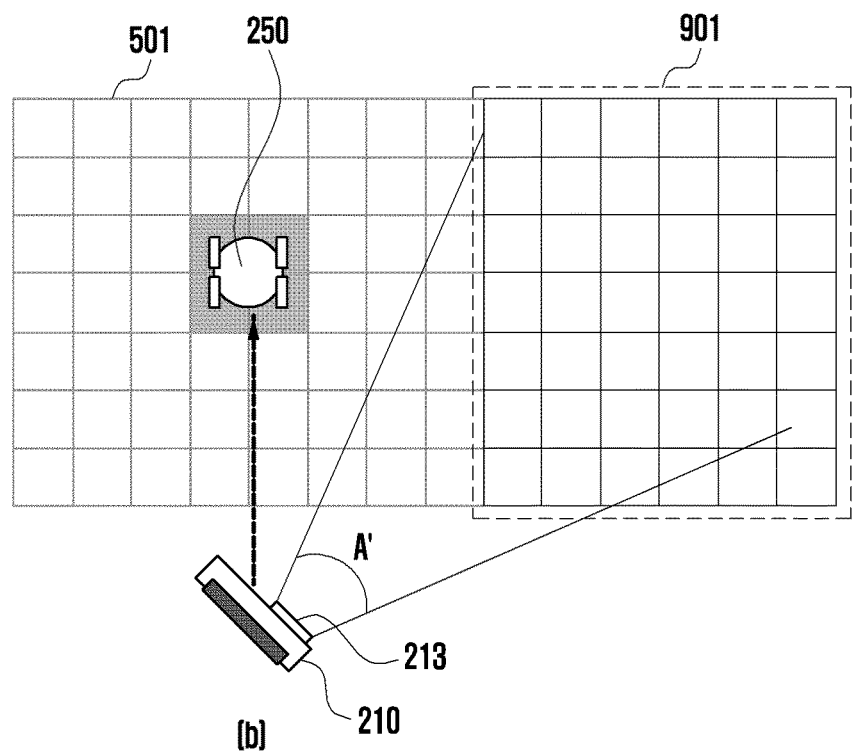
(b)

ELECTRONIC DEVICE AND METHOD FOR CONTROLLING ROBOT

CROSS-REFERENCE TO RELATED APPLICATION(S)

This application is based on and claims priority under 35 U.S.C. § 119 to Korean Patent Application No. 10-2020-0007681, filed on Jan. 21, 2020, in the Korean Intellectual Property Office, the disclosure of which is incorporated by reference herein in its entirety.

BACKGROUND

1. Field

The disclosure relates generally to an electronic device and method for controlling a mobile robot.

2. Description of Related Art

Electronic devices such as industrial robots and daily robots can provide various services to users.

Industrial robots can provide factory automation services that perform predetermined tasks on behalf of workers. For example, an industrial robot may include a factory automation robot and a medical robot.

Daily robots can provide services that help people in their daily lives in public places, such as airports, malls, and homes. For example, a daily robot may include a guide robot or a cleaning robot.

Electronic devices including the-above-described robots can be applied to various fields such as healthcare technologies and smart home technologies.

A robot may require assistance from a device (e.g., a robot control system) and an expert to control mechanical operations.

A typical robot can perform a predetermined operation according to a command determined in advance by a robot control system, an expert, or a command input by a user.

Since robots operate under predetermined conditions, services that can be provided to users may be limited.

SUMMARY

The present disclosure has been made to address the above-mentioned problems and disadvantages, and to provide at least the advantages described below.

According to an aspect of the disclosure, an electronic device for controlling a robot includes a wireless communication unit; a camera; a touch display; a memory; and a processor configured to be operatively connected to the wireless communication unit, the camera, the touch display, and the memory. The processor is configured to recognize a marker of the robot photographed using the camera; generate an indicator indicating a space around the recognized robot; acquire location information for moving the robot to an area within the indicator by using the touch display; and transmit the acquired location information to the robot to move the robot to a location corresponding to the acquired location information.

According to another aspect of the disclosure, a method for controlling a robot includes recognizing a marker of a robot photographed using a camera; generating an indicator indicating a space around the recognized robot; acquiring location information for moving the robot to an area within the indicator by using a touch display; and transmitting the acquired location information to the robot so that the robot moves to a location corresponding to the acquired location information.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 illustrates an extension region of an indicator (e.g., a matrix), according to an embodiment;

DETAILED DESCRIPTION

Various embodiments may provide a method for controlling a mobile robot by using an electronic device (e.g., a mobile terminal).

According to various embodiments, an electronic device (e.g., a mobile terminal) may generate an indicator (e.g., a matrix) having a plurality of cells (e.g., specific coordinates) for a space around a robot, and may move the robot to the specific coordinates through the electronic device so that the robot can perform an interaction with a specific object within the indicator.

Hereinafter, various example embodiments of the disclosure will be described in greater detail with reference to accompanying drawings.

Figure 1:
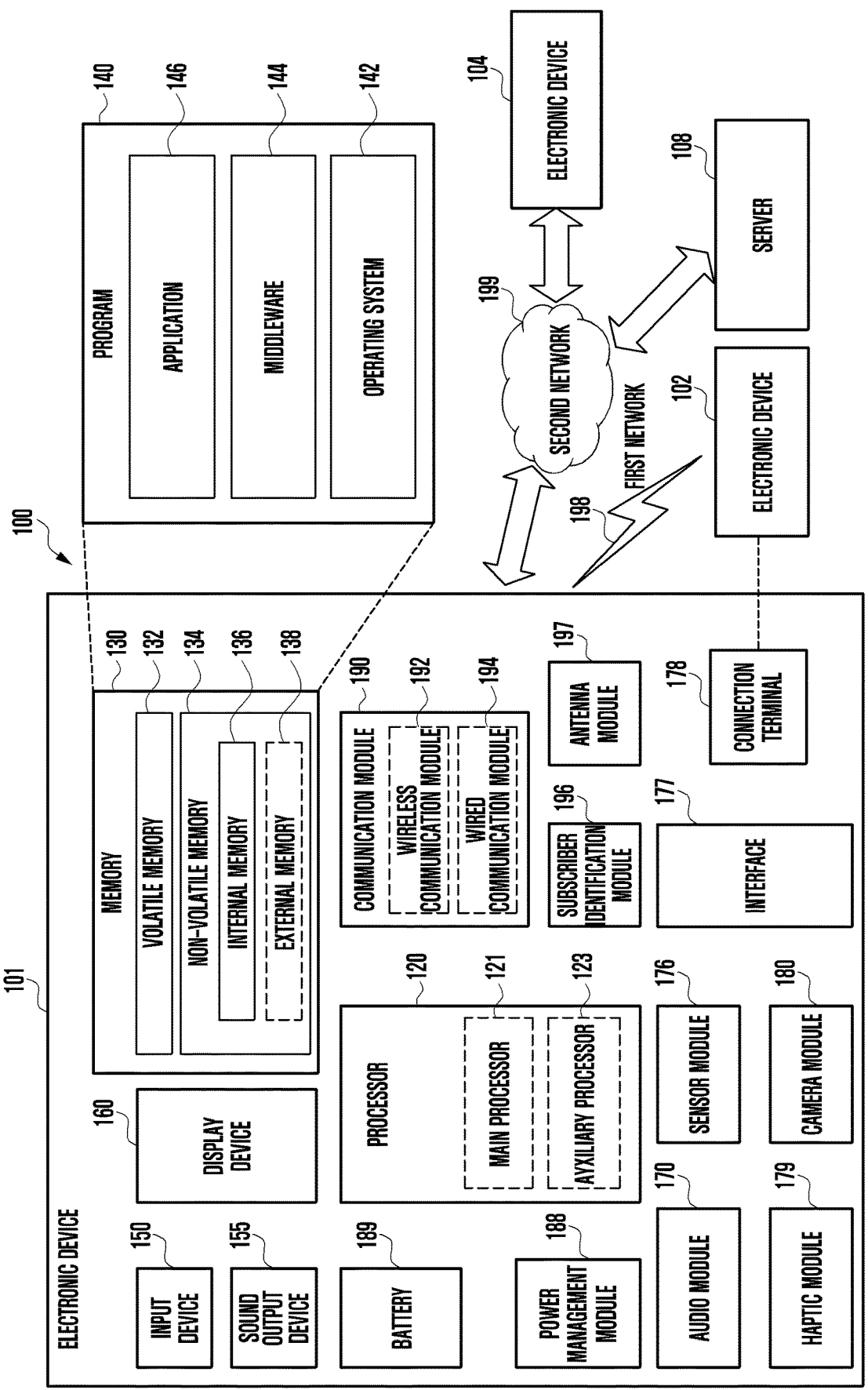
FIG. 1 illustrates an electronic device in a network environment, according to an embodiment.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform certain data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store certain data used by at least one component (e.g., the processor 120 or the sensor module 176) of the electronic device 101. The certain data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These certain types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit/receive a signal or power to/from an external entity (e.g., an external electronic device). According to some embodiments, the antenna module 197 may be formed of a conductor or a conductive pattern and may further include any other component (e.g., a radio frequency integrated circuit (RFIC)). According to an embodiment, the antenna module 197 may include one or more antennas, which may be selected to be suitable for a communication scheme used in a specific communication network, such as the first network 198 or the second network 199 by, for example, the communication module 190. Through the selected at least one antenna, a signal or power may be transmitted or received between the communication module 190 and the external electronic device.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of certain types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include certain changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
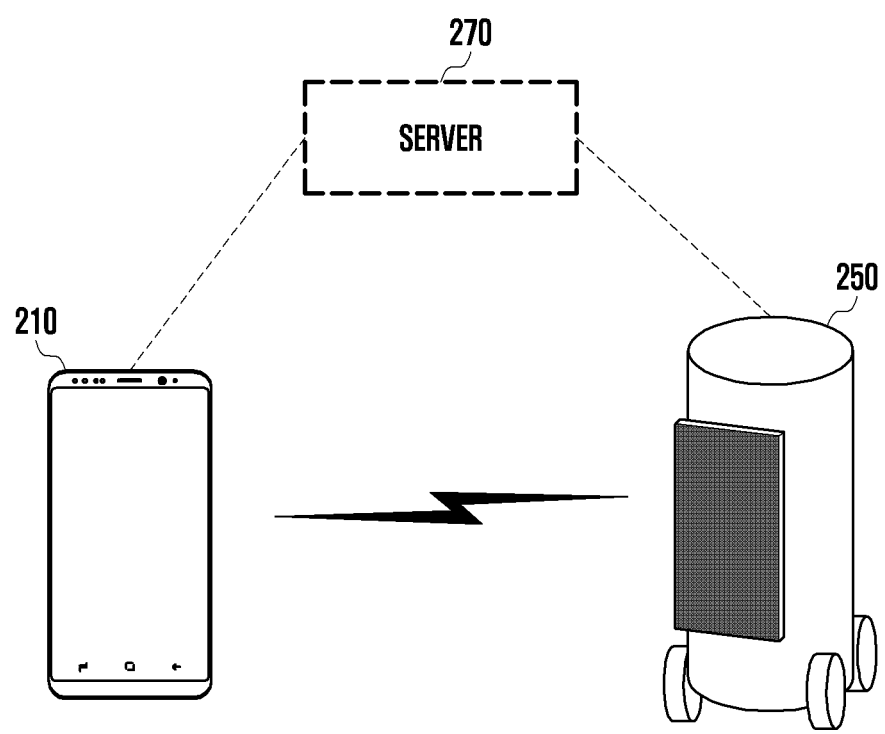
FIG. 2 illustrates a system for controlling a robot by using an electronic device, according to an embodiment.

FIG. 2 illustrates a system for controlling a robot by using an electronic device (e.g., a mobile terminal), according to an embodiment.

Referring to FIG. 2, the system for controlling the robot includes an electronic device 210, a robot 250, and a server 270.

The electronic device 210 may recognize the robot 250 as a marker. The electronic device 210 may generate an indicator (e.g., a matrix) having a plurality of cells for a space around the robot 250 recognized as the marker. The plurality of cells may have specific coordinate information. The specific coordinate information may include the current location of the robot 250 and coordinates of a destination to be moved to. The electronic device 210 may control the robot 250 to move to a certain area (e.g., a specific cell or specific coordinates) within the indicator. The electronic device 210 may control the robot 250 to interact with a specific object within the indicator. The electronic device 210 may control the robot 250 to perform a task on the specific object.

The electronic device 210 may include at least one of a smart phone, a tablet personal computer (PC), a mobile phone, a video phone, an e-book reader, a desktop PC, a laptop PC, a netbook computer, a personal digital assistant (PDA) or a portable multimedia player (PMP) device, which can control the robot 250.

The robot 250 may be used as a marker. The robot 250 may move under the control of the electronic device 210. The robot 250 may interact with a specific object (e.g., a person or a product) under the control of the electronic device 210. The robot 250 may provide a reference point (e.g., coordinates) at which the electronic device 210 generates an indicator (e.g., a matrix).

The robot 250 may include a mobile robot. The robot 250 may include at least one of a cleaner, an air cleaner, a drone, and a guide robot. The robot 250 may include at least one of the components of the electronic device 101 of FIG. 1.

The server 270 may communicate with the electronic device 210 and/or the robot 250 using the first network 198 and/or the second network 199 disclosed in FIG. 1.

When the server 270 is placed indoors, the server 270 may provide map information on a specific object (e.g., a product) to the electronic device 210 or the robot 250. The server 270 may identify and recognize the location of the electronic device 210 or the robot 250 using indoor positioning. The server 270 may move the robot 250 by using indoor navigation. The robot 250 may receive and store the map information on the specific object from an administrator. The map information may include location information for a specific product (e.g., a washing machine).

When the server 270 is placed outdoors, the server 270 may calculate the locations of the electronic device 210 and the robot 250 based on a global positioning system (GPS) signal. The server 270 may provide location information of the robot 250 to the electronic device 210. The server 270 may transmit location information of the electronic device 210 to the robot 250.

Figure 3:
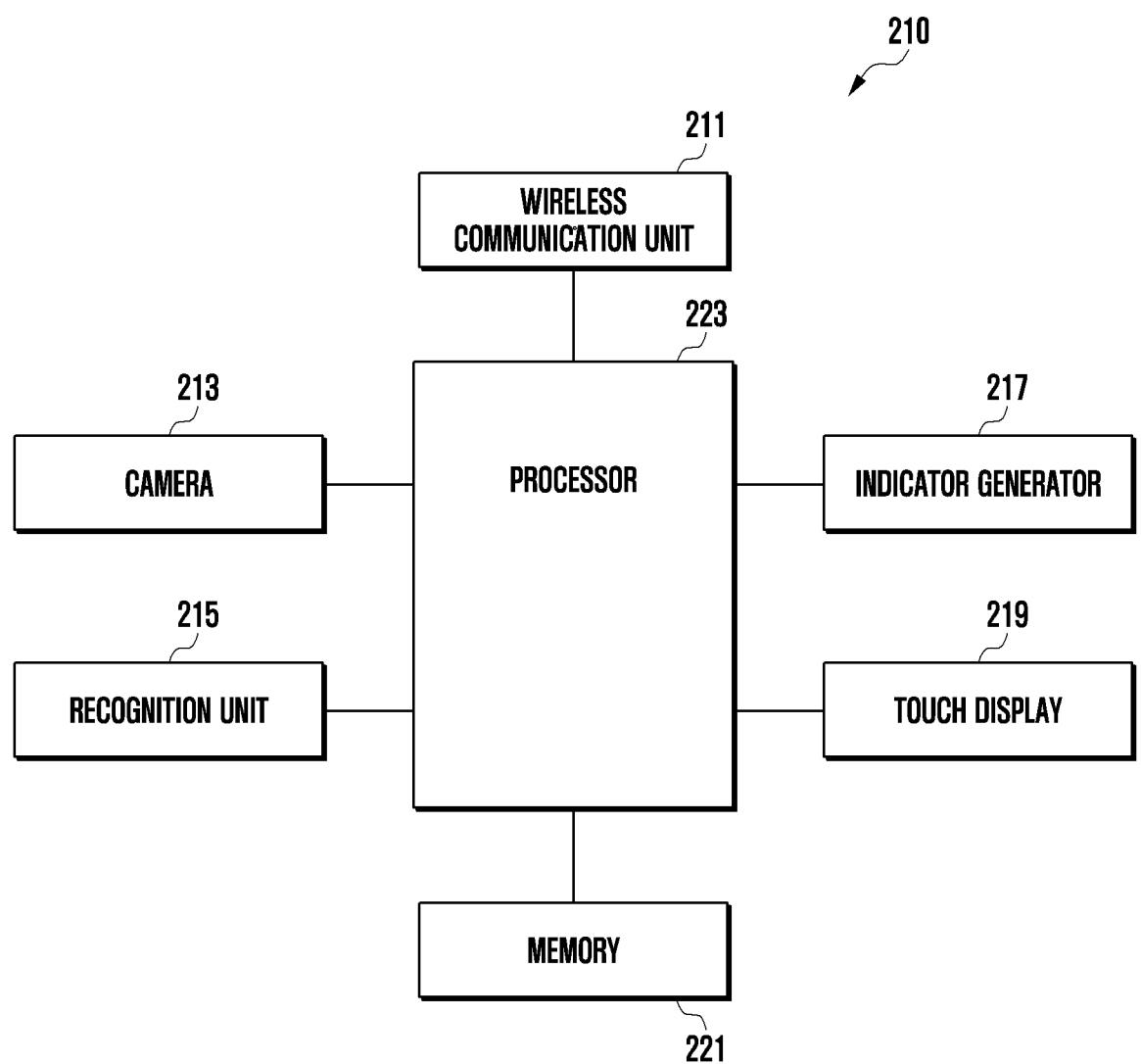
FIG. 3 illustrates a configuration of an electronic device, according to an embodiment.

FIG. 3 illustrates an electronic device (e.g., a mobile terminal), according to an embodiment.

Referring to FIG. 3, the electronic device 210 may include a wireless communication unit 211, a camera 213, a recognition unit 215, an indicator generator 217, a touch display 219, a memory 221, and a processor 223.

The wireless communication unit 211 may communicate with the robot 250 or the server 270 using the first network 198 or the second network 199 disclosed in FIG. 1.

The wireless communication unit 211 may establish a communication channel to support at least one of a voice call, a video call, and a data communication function of the electronic device 210. The wireless communication unit 211 may include various communication modules such as a mobile communication module (e.g., at least one module capable of supporting various communication methods such as second generation (2G) communication, third generation (3G) communication, fourth generation (4G) communication, or fifth generation (5G) communication), a wireless fidelity (Wi-Fi) module, or a short-range communication module.

The camera 213 may photograph the robot 250. The camera 213 may identify a marker 253 disposed at a predetermined position of the robot 250.

The camera 213 may capture a still image and a moving image. The camera 213 may include one or more image sensors (e.g., a front sensor or a rear sensor), a lens, an ISP, or a flash (e.g., a light emitting diode (LED) or a xenon lamp).

The recognition unit 215 may recognize the marker 253 of the robot 250 photographed through the camera 213, and may support the electronic device 210 to enter an augmented reality (AR) mode.

The indicator generator 217 may generate an indicator such as a matrix for a specific planar space around the recognized robot 250. The indicator (e.g., a matrix) may include a plurality of cells. The plurality of cells may have coordinate information. The indicator may include an AR matrix. The size and direction of the indicator may be generated based on the size and direction information of the robot 250.

When the indicator generator 217 receives map information on a specific object (e.g., a product) through the server 270, the indicator generator 217 may generate the indicator as having absolute coordinates rather than relative coordinates.

The touch display 219 may display the indicator (e.g., the matrix) generated through the indicator generator 217. The indicator may be displayed to have a plurality of cells (or coordinate information) in the form of AR. The touch display 219 may select a specific cell or coordinate to move the robot 250 to a specific location. The size and direction of the indicator may be displayed based on the size and direction information of the robot 250. The touch display 219 may input a control command so that the robot 250 performs an interaction or a specific task with respect to a specific object (e.g., a person or a product) within the indicator.

The touch display 219 may perform an input function and a display function. The touch display 219 may include a touch panel and a display unit. The touch display 219 may visually provide a menu, input data, function configuration information, or other various types of information of the electronic device 210 to a user.

The memory 221 may store identification information of the robot 250. The memory 221 may store an indicator (e.g., a matrix) and coordinate information (e.g., relative coordinates and absolute coordinates) generated for the indicator. The memory 221 may store map information on a specific object (e.g., a product). The memory 221 may store information that enables the robot 250 to interact with the specific object. The memory 221 may store a task that the robot 250 can perform on the specific object.

The memory 221 may perform a function of storing a program for processing and controlling the processor 223 of the electronic device 210, an OS, various applications, and input/output data, and may store a program for controlling the overall operation of the electronic device 210. The memory 221 may store various types of configuration information required when the electronic device 210 processes functions related to various embodiments.

The processor 223 may be operatively connected to the wireless communication unit 211, the camera 213, the recognition unit 215, the indicator generator 217, the touch display 219, and the memory 221. The processor 223 may control functions and operations of the wireless communication unit 211, the camera 213, the recognition unit 215, the indicator generator 217, the touch display 219, and the memory 221. The processor 223 may perform functions of the recognition unit 215 and the indicator generator 217. The functions of the recognition unit 215 and the indicator generator 217 may be integrated into the processor 223.

The processor 223 may recognize the marker 253 of the robot 250 photographed using the camera 213. The processor 223 may generate an indicator indicating a space around the recognized robot 250. The processor 223 may acquire location information for moving the robot 250 to an area within the indicator by using the touch display 219. The processor 223 may transmit the acquired location information to the robot 250 and may control the robot 250 to move to a location corresponding to the acquired location information.

The processor 223 may control the robot 250 to move to a specific cell or coordinate within the indicator (e.g., the matrix). The processor 223 may control the robot 250 to perform an interaction with a specific object (e.g., a person or a product) within the indicator. The processor 223 may control the robot 250 to perform a task on the specific object.

The processor 223 may control the overall operation of the electronic device 210 and a signal flow between internal components thereof, and may perform a function of processing data. The processor 223 may include, for example, a CPU, an AP, and a CP. The processor 223 may include a single core processor, a multi-core processor, and/or a plurality of processors.

Figure 4:
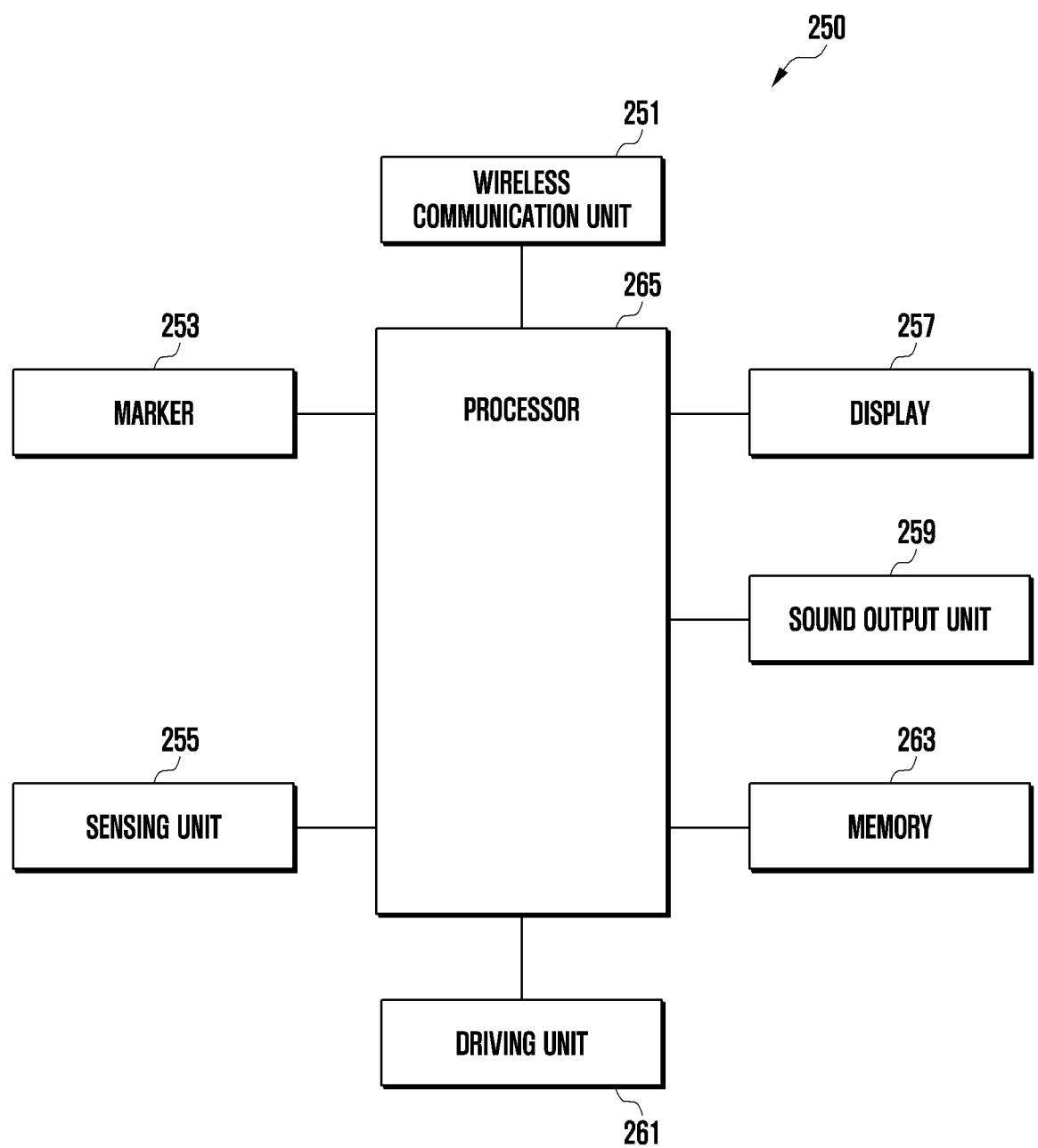
FIG. 4 illustrates a configuration of a robot, according to an embodiment.

FIG. 4 illustrates a configuration of a robot, according to an embodiment.

Referring to FIG. 4, the robot 250 includes a wireless communication unit 251, a marker 253, a sensing unit 255, a display 257, a sound output unit 259, a driving unit 261, a memory 263, and a processor 265.

The wireless communication unit 251 may perform a communication function with the electronic device 210 or the server 270 using the first network 198 or the second network 199 disclosed in FIG. 1.

The marker 253 may include an identifier of the robot 250. The marker 253 may include an identification code in the form of a paper to identify the specific robot 250. The marker 253 may be disposed above the display 257. The marker 253 may be arbitrarily configured by the processor 265 and may be provided to the display 257.

The sensing unit 255 may be configured to allow the robot 250 to detect a specific object (e.g., a person or a specific product). The sensing unit 255 may detect an obstacle when the robot 250 moves. The sensing unit 255 may detect at least one of a shape, eyes, a nose, and a mouth of a person. The sensing unit 255 may detect a specific product (e.g., a washing machine or a refrigerator) using map information.

The sensing unit 255 may include at least one of a proximity sensor, an ultrasonic sensor, an image sensor, a gesture sensor, a gyro sensor, an atmospheric pressure sensor, a magnetic sensor, an acceleration sensor, a grip sensor, a color sensor (e.g., a red, green, and blue (RGB) sensor), an IR sensor, a biometric sensor, a temperature sensor, a humidity sensor, an ultra violet (UV) sensor, or an illuminance sensor.

The display 257 may display user interface information provided to a user. For example, the display 257 may display an advertisement provided to the user.

The sound output unit 259 may output sound provided to the user. For example, the sound output unit 259 may output guide information on the specific object (e.g., the product) provided to the user through sound.

The driving unit 261 may move the robot 250. The driving unit 261 may be moved according to the control of the electronic device 210. The driving unit 261 may include a wheel type driving unit having at least one wheel, a caterpillar type driving unit, or a leg movement type driving unit.

The memory 263 may store user interface information and sound information provided to the user. The memory 263 may store cell information or coordinate information in which the robot 250 is located. The memory 263 may store map information on a specific object (e.g., a product). The memory 263 may store information that enables the robot 250 to interact with a specific object (e.g., a person or a product). The memory 263 may store task information provided to the user.

The processor 265 may be operatively connected to the wireless communication unit 251, the marker 253, the sensing unit 255, the display 257, the sound output unit 259, the driving unit 261, and the memory 263. The processor 265 may control the functions and operations of the wireless communication unit 251, the marker 253, the sensing unit 255, the display 257, the sound output unit 259, the driving unit 261, and the memory 263.

The processor 265 may move the robot 250 to a specific cell or specific coordinates within an indicator (e.g., a matrix) under the control of the electronic device 210. The processor 265 may control the robot 250 to perform an interaction with the specific object (e.g., the person or the specific product) within the indicator according to the control of the electronic device 210. The processor 265 may control the robot 250 to perform a task on the specific object under the control of the electronic device 210.

Figure 5:
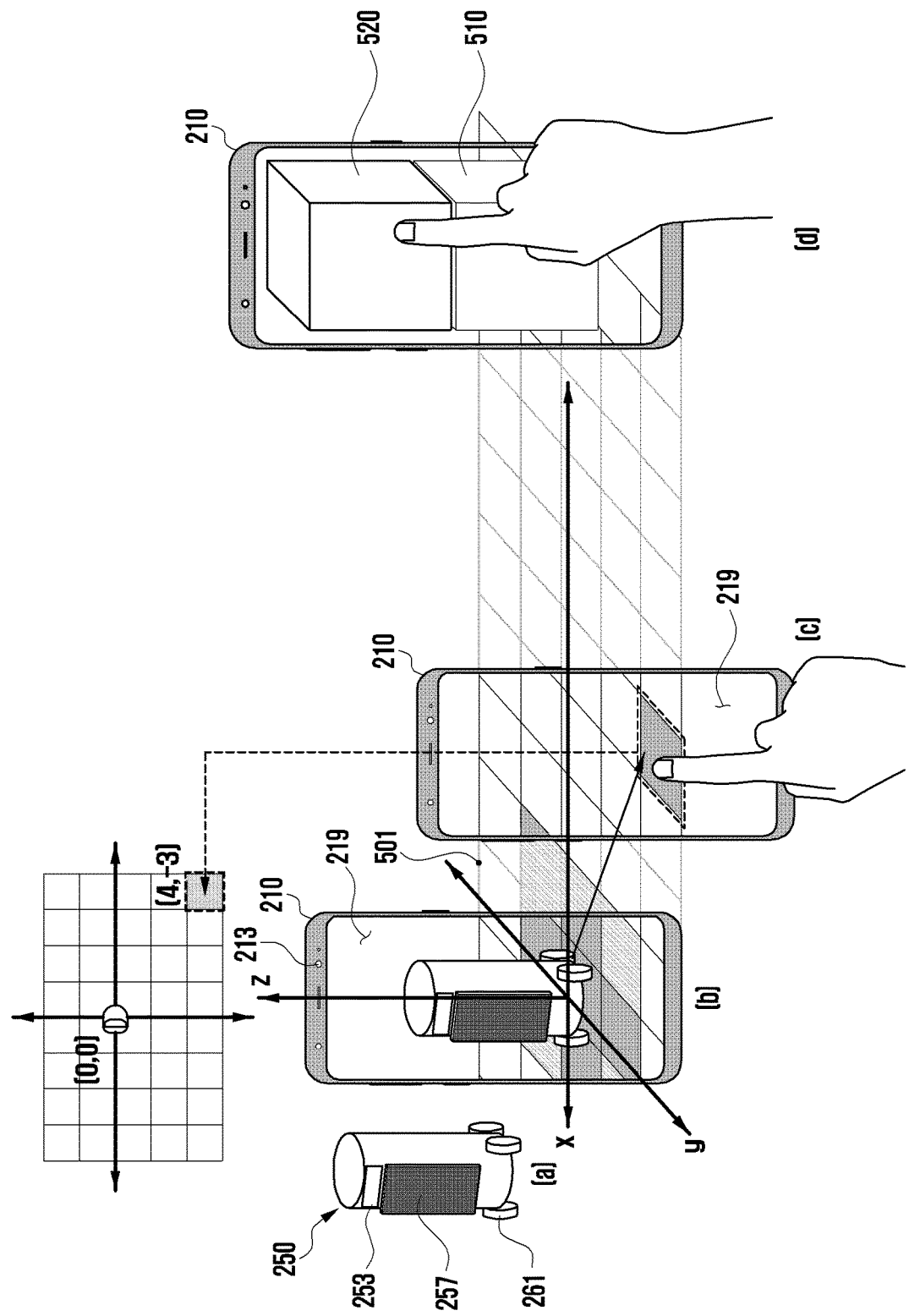
FIG. 5 illustrates a method for controlling a robot by using an electronic device, according to an embodiment.

FIG. 5 is a diagram illustrating a method for controlling a robot by using an electronic device, according to an embodiment.

Referring to section [a] of FIG. 5 and section [b] of FIG. 5, the electronic device 210 may photograph and recognize a marker 253 attached to a predetermined position (e.g., a position above the display 257) of the robot 250 using the camera 213 and the recognition unit 215, and may enter an AR mode.

The electronic device 210 may generate a grid-shaped indicator 501 (e.g., a matrix) with respect to coordinates (e.g., 0, 0) (or a cell) at which the robot 250 is located, using the indicator generator 217. The indicator 501 may include a cell corresponding to the grid shape. The size and direction of the indicator 501 may be generated based on the size and direction information of the robot 250. The indicator 501 may be generated by extending as the angle of view of the camera 213 of the electronic device 210 is moved. The indicator 501 may be updated based on coordinates (e.g., x, y) or a cell at which the robot 250 is currently located.

Referring to section [c] of FIG. 5, the electronic device 210 may receive, from the user, a selection of specific coordinates (e.g., 4, −3) (or a destination cell) to which the robot 250 is to be moved, using the touch display 219.

The electronic device 210 may transmit the selected specific coordinates (e.g., 4, −3) to the robot 250 using the wireless communication unit 211. The robot 250 may be moved to the specific coordinates (e.g., 4, −3) within the indicator 501 by using the driving unit 261. The indicator 501 may be updated based on the coordinates (e.g., 4, −3) at which the robot 250 is moved and is currently located.

Referring to section [d] of FIG. 5, the robot 250 may approach specific objects 510 and 520 within the indicator 501 according to the user's selection of the specific objects 510 and 520 through the touch display 219 of the electronic device 210, thereby performing a predetermined task. For example, the robot 250 may provide, to the user through the display 257 and/or the sound output unit 259, product descriptions of the specific objects 510 and 520 (e.g., the components of a washing machine) stacked in the same coordinates (or cell), according to the user's selection of the specific objects 510 and 520. The robot 250 may identify the specific objects 510 and 520 stacked in the same coordinates (e.g., stacked along the z-axis) through the map information stored in the memory 263.

Figure 6:
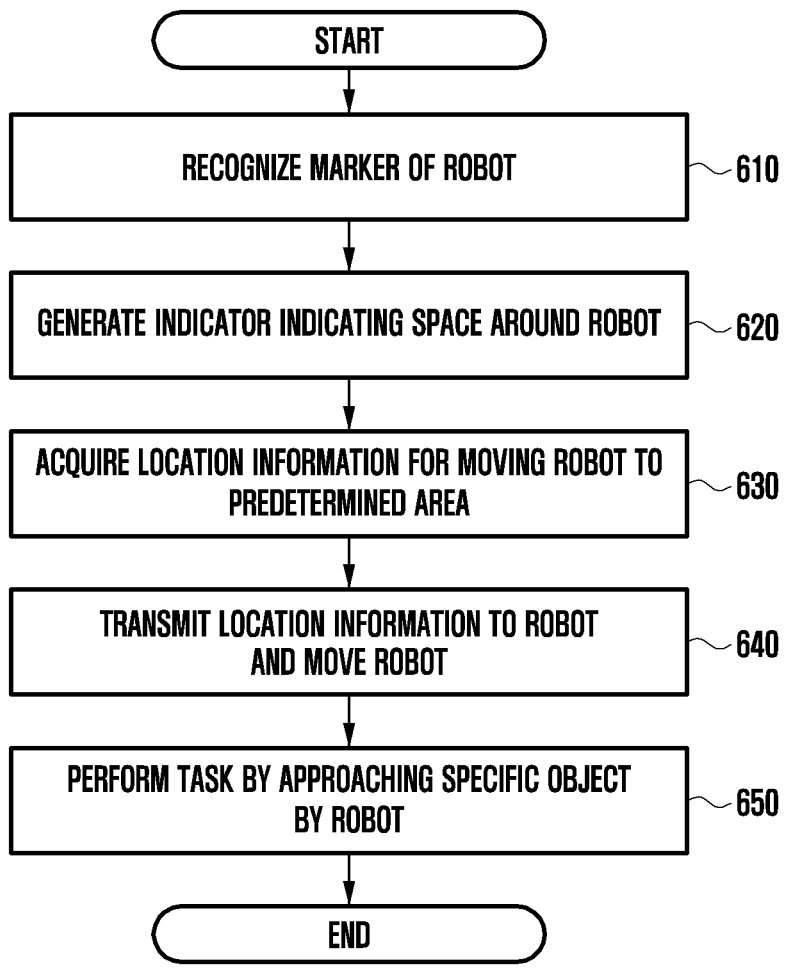
FIG. 6 is a flowchart illustrating a method for controlling a robot by using an electronic device, according to an embodiment.

FIG. 6 is a flowchart illustrating a method for controlling a robot by using an electronic device, according to an embodiment.

In step 610, the electronic device 210 photographs and recognizes the marker 253 of the robot 250 using the camera 213 and the recognition unit 215.

In step 620, the electronic device 210 generates an indicator (e.g., a matrix) having specific coordinate information for a space around the recognized robot 250 by using the indicator generator 217. The indicator may include a plurality of cells corresponding to specific coordinates.

In step 630, the electronic device 210 acquires location information (e.g., specific coordinates or cell information) for moving the robot 250 to an area within the indicator through the touch display 219.

In step 640, the electronic device 210 transmits the acquired location information (e.g., specific coordinates or cell information) to the robot 250 through the wireless communication unit 211, and may move the robot 250 to a location corresponding to the location information (e.g., specific coordinates or cell information).

In step 650, the robot 250 moved under the control of the electronic device 210 approaches a specific object (e.g., a person or a product) and performs a predetermined task. The robot 250 may perform a predetermined interaction with the specific object under the control of the electronic device 210.

Figure 7:
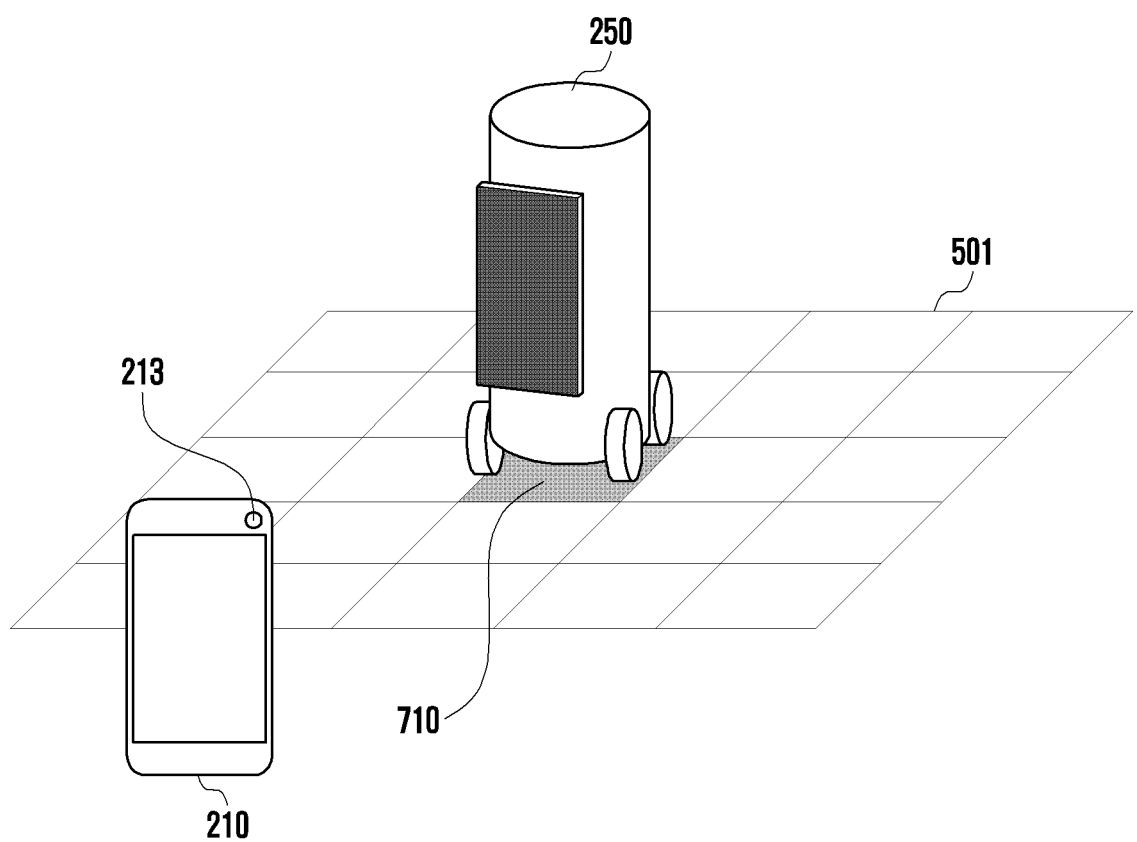
FIG. 7 is a diagram illustrating how to determine the size of an indicator (e.g., a matrix), according to an embodiment.
Figure 8:
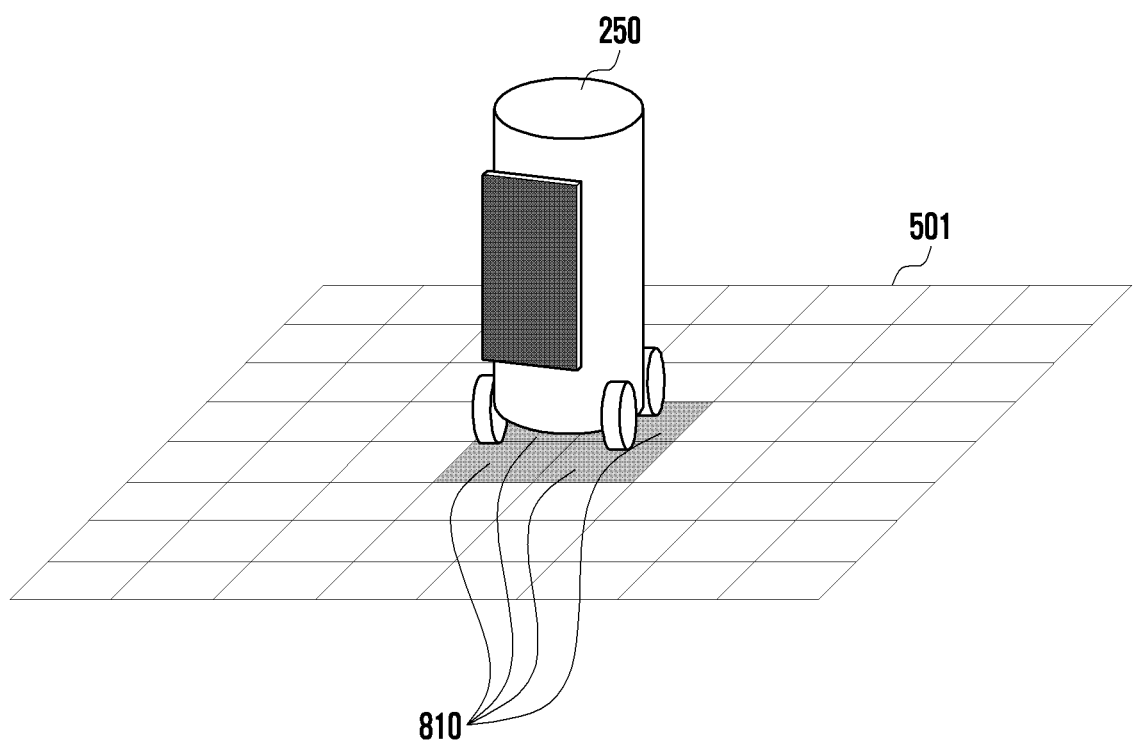
FIG. 8 is a diagram illustrating how to determine the size of an indicator (e.g., a matrix), according to an embodiment.

FIGS. 7-8 are diagrams illustrating how to determine the size of an indicator (e.g., a matrix), according to various embodiments.

The indicator 501 (e.g., the matrix) may be generated by the indicator generator 217 based on the size of the robot 250 photographed using the camera 213 of the electronic device 210. The indicator 501 may include a shape of a plurality of cells so that the user of the electronic device 210 can intuitively select a location at which the robot 250 is to be moved. The indicator 501 may include a matrix having a grid shape.

Referring to FIG. 7, the size of a cell in the indicator 501 may be determined to be 1/n of the size of the robot 250. For example, a size of the grid of the indicator 501 may be adjusted so that the robot 250 is disposed in one cell 710.

Referring to FIG. 8, a size of the grid of the indicator 501 may be adjusted so that the robot 250 is disposed in a plurality of cells 810 (e.g., four cells).

FIG. 9 illustrates an extension region of an indicator (e.g., a matrix), according to an embodiment.

Referring to section [a] of FIG. 9, the electronic device 210 may generate the indicator 501 (e.g., the matrix) in a region corresponding to an angle of view A of the camera 213 with respect to a cell or coordinates at which the robot 250 is located, using the indicator generator 217.

Referring to section [b] of FIG. 9, when the camera 213 is moved in one direction (e.g., to the right side), the electronic device 210 may generate an extension region 901 of the indicator 501 in a region corresponding to an angle of view A' of the moved camera 213.

Figure 10:
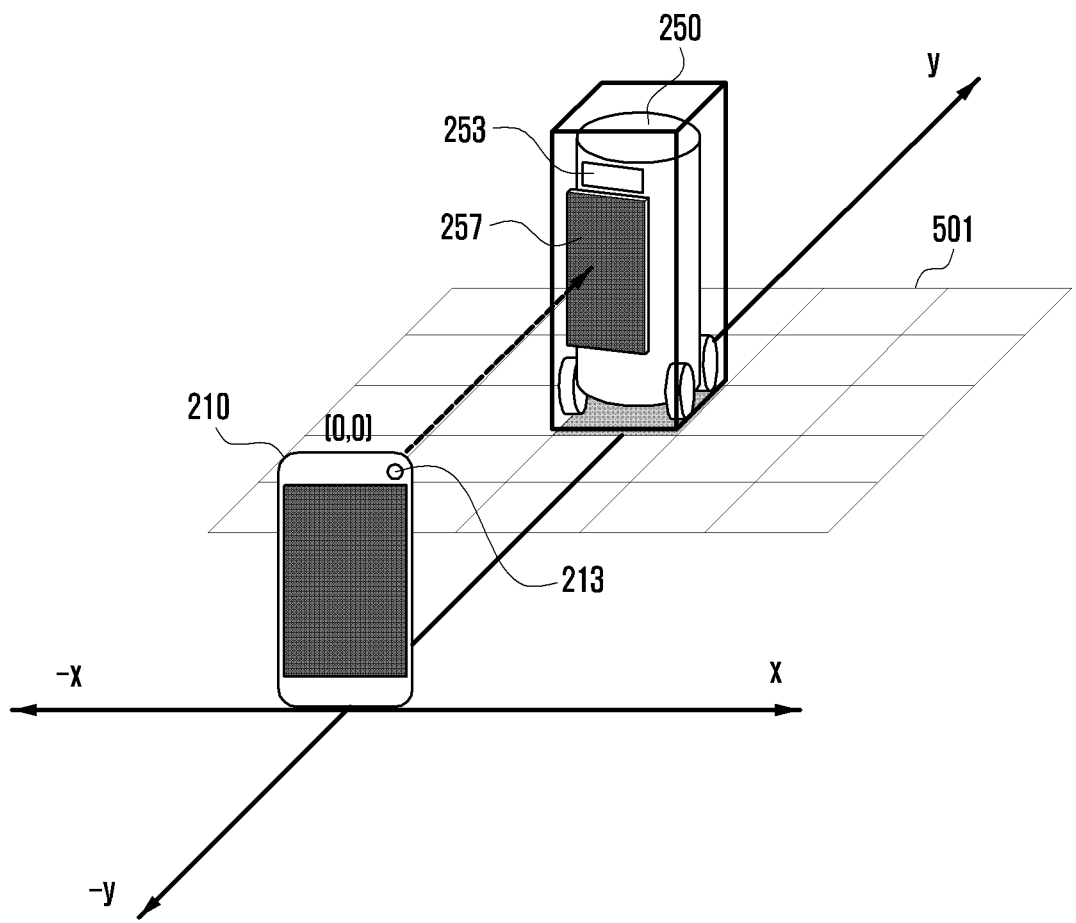
FIG. 10 is a diagram illustrating how to generate an indicator (e.g., a matrix) having relative coordinates with respect to a location of an electronic device, according to an embodiment.

FIG. 10 is a diagram illustrating how to generate an indicator (e.g., a matrix) having relative coordinates with respect to a location of an electronic device, according to an embodiment.

Referring to FIG. 10, the electronic device 210 may photograph the robot 250 and/or the marker 253 of the robot 250 using the camera 213. The marker 253 of the robot 250 may be disposed above the display 257.

The electronic device 210 may generate the indicator 501 (e.g., the matrix) having a plurality of cells or coordinates with respect to coordinates (e.g., 0, 0) at which the front of the marker 253 of the robot 250 is photographed using the camera 213. The electronic device 210 may generate the indicator 501 in a direction in which the marker 253 of the robot 250 is viewed as a reference axis (e.g., 0, y).

Figure 11:
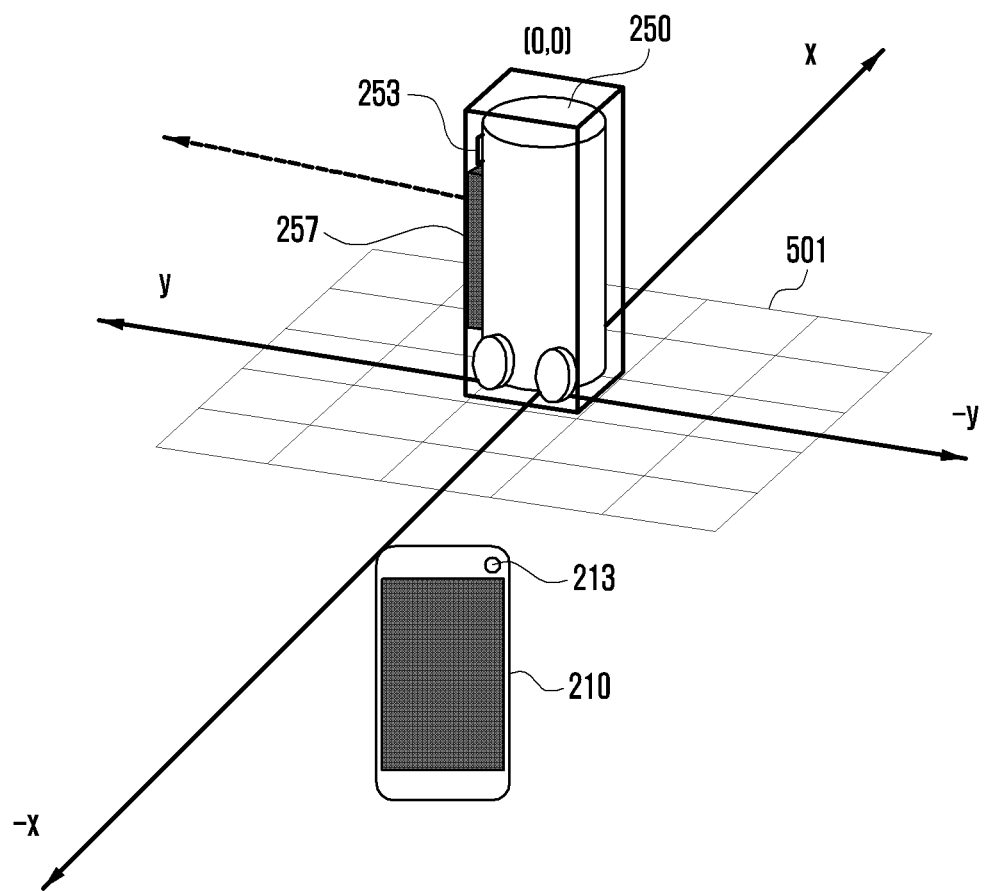
FIG. 11 is a diagram illustrating how to generate an indicator (e.g., a matrix) having relative coordinates with respect to a direction in which a marker of a robot is arranged, according to an embodiment.

FIG. 11 is a diagram illustrating how to generate an indicator (e.g., a matrix) having relative coordinates with respect to a direction in which a marker of a robot is arranged, according to an embodiment.

Referring to FIG. 11, the electronic device 210 may photograph the robot 250 using the camera 213. The electronic device 210 may generate the indicator 501 (e.g., the matrix) in a direction in which the robot 250 faces (e.g., a direction in which the marker 253 is viewed from the front) as a reference axis, with respect to coordinates (e.g., 0) at which the robot 250 is located.

The electronic device 210 may generate the indicator 501 in a different form according to the recognition location of the marker 253 of the robot 250 photographed using the camera 213.

Figure 12:
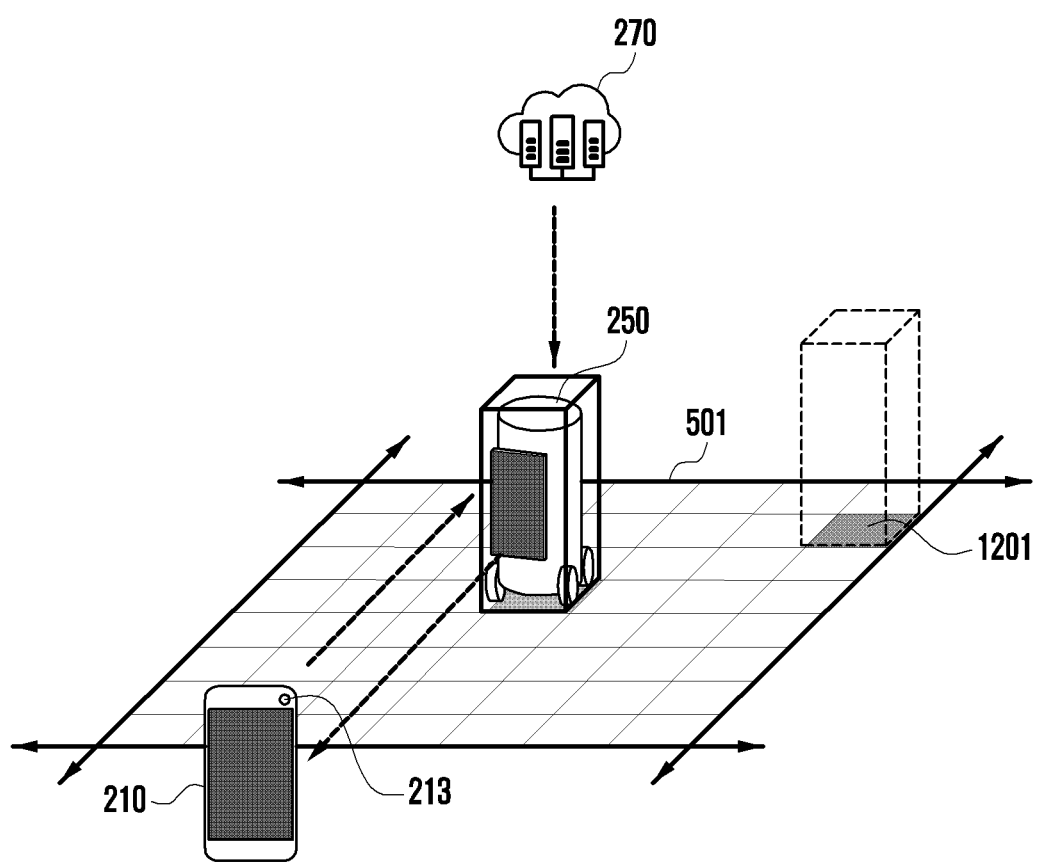
FIG. 12 illustrates an electronic device that receives indicator information having absolute coordinates using a server, according to an embodiment.

FIG. 12 illustrates an electronic device that receives indicator information having absolute coordinates using a server, according to an embodiment.

Referring to FIG. 12, the server 270 may provide map data which is made into a matrix for a predetermined space, to the robot 250. The robot 250 may provide the map data, which is made into a matrix, provided through the server 270 to the electronic device 210 by using the wireless communication unit 251.

The electronic device 210 may display the indicator 501 (e.g., the matrix) near a point where the robot 250 is located on the touch display 219 based on the map data provided from the robot 250. When a destination cell 1201 (e.g., coordinates) to which the robot 250 is to be moved is selected through the touch display 219 of the electronic device 210, the robot 250 may be moved to the destination cell 1201. When a specific object (e.g., a person or a product) to interact with the robot 250 is selected through the touch display 219, the electronic device 210 may move the robot 250 to perform a task on the specific object.

Figure 13:
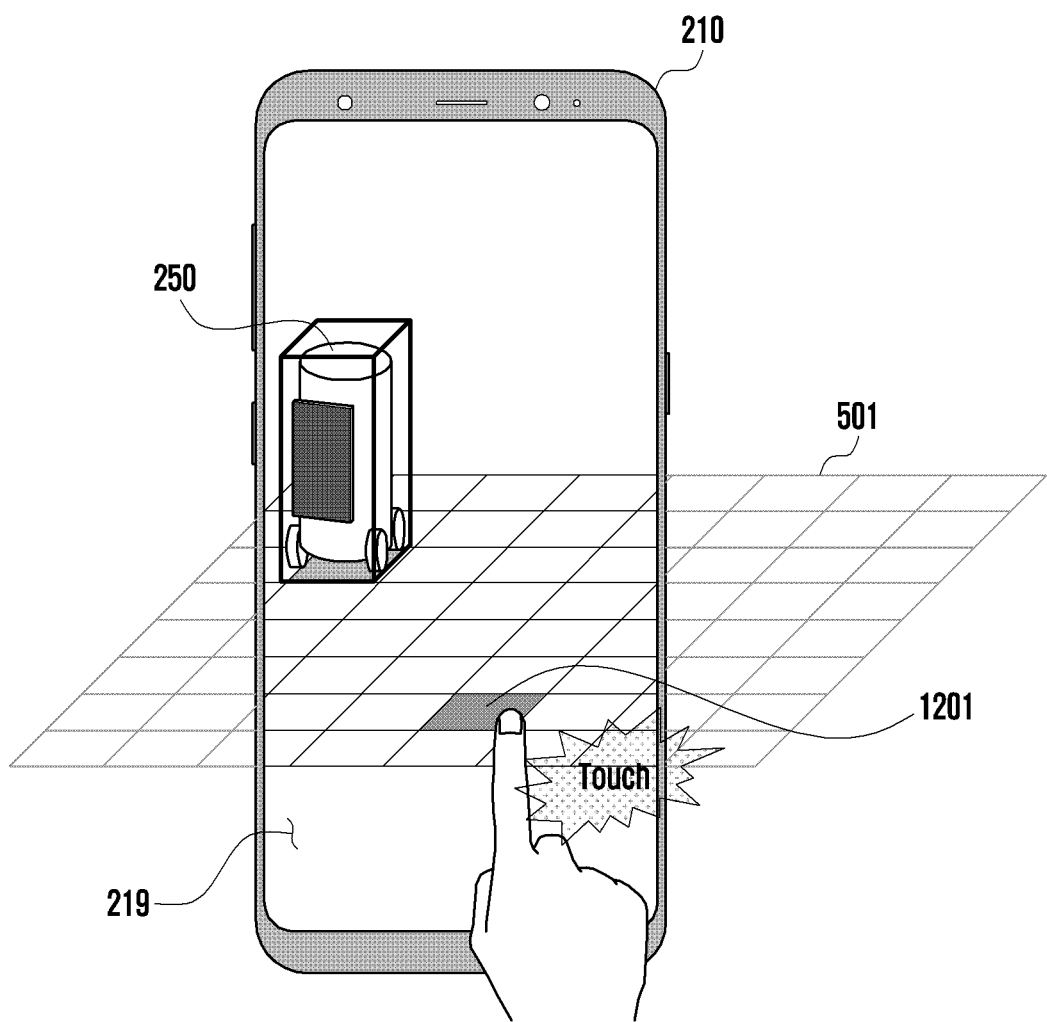
FIG. 13 is a diagram illustrating how to move a robot by touching an electronic device, according to an embodiment.

FIG. 13 is a diagram illustrating how to move a robot by touching an electronic device, according to an embodiment.

Referring to FIG. 13, when the destination cell 1201 to which the robot 250 is to be moved is selected from the indicator 501 (e.g., the matrix) displayed on the touch display 219, the electronic device 210 may control the robot 250 to move to the destination cell 1201.

Figure 14:
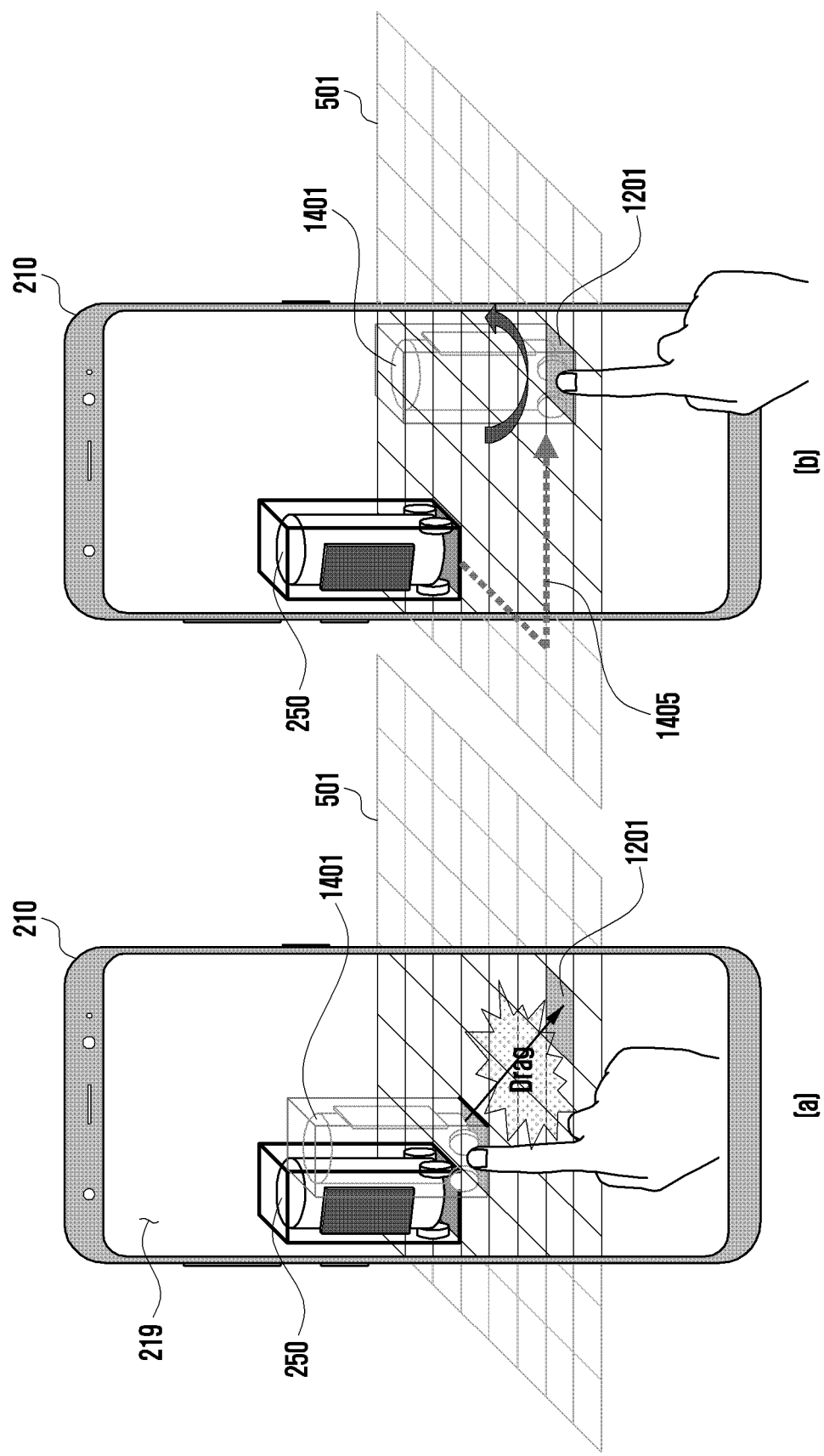
FIG. 14 is a diagram illustrating how to move a robot by using a dragging operation of an electronic device, according to an embodiment.

FIG. 14 is a diagram illustrating how to move a robot by using a dragging operation of an electronic device, according to an embodiment.

Referring to section [a] of FIG. 14, the electronic device 210 may perform a dragging operation on the robot 250 by using the indicator 501 (e.g., a matrix) displayed on the touch display 219 to move the robot 250 to the destination cell 1201.

When the dragging operation is performed on the robot 250, the electronic device 210 may generate a virtual robot 1401 on the touch display 219 and may display a path through which the virtual robot 1401 moves to the destination cell 1201.

Referring to section [b] of FIG. 14B, when moving the robot 250 to the destination cell 1201 by the dragging operation on the robot 250 using the indicator 501 displayed on the touch display 219, the electronic device 210 may display a predicted movement path 1405 of the robot 250 and a direction of the virtual robot 1401 located at the destination cell 1201 on the touch display 219.

The predicted movement path 1405 of the robot 250 may be displayed in color. When the predicted movement path 1405 of the robot 250 is not a straight line, an obstacle may exist between the location of the robot 250 (before the robot 250 is moved) and the destination cell 1201.

Figure 15:
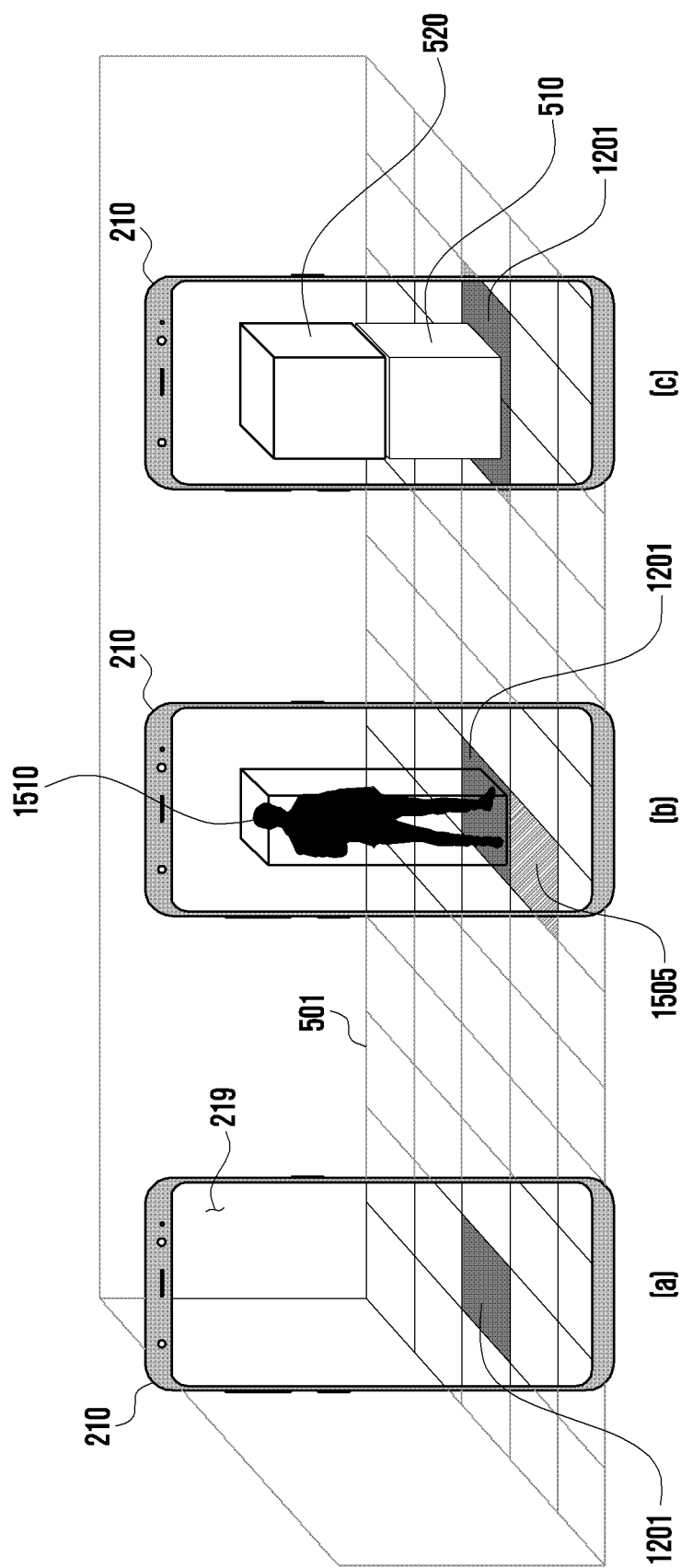
FIG. 15 illustrates a task performed by a robot according to the presence or absence of a specific object, according to an embodiment.

FIG. 15 illustrates a task performed by a robot according to the presence or absence of a specific object, according to an embodiment.

Referring to section [a] of FIG. 15, the electronic device 210 may receive a selection of the destination cell 1201 at which a specific object (e.g., a person or a product) does not exist through the touch display 219. The robot 250 may be moved to the selected destination cell 1201. The robot 250 may perform a task transferred from the electronic device 210 at the location of the destination cell 1201 to which the robot 250 is moved.

When the robot 250 is, for example, a retailbot, the retailbot may move to the destination cell 1201 at which the specific object does not exist, and may perform an event such as playing an advertisement or dancing.

When the robot 250 is, for example, a cleaner, the cleaner may perform cleaning while moving to the destination cell 1201.

Referring to section [b] of FIG. 15, the electronic device 210 may receive a selection of the destination cell 1201 at which a specific object 1510 (e.g., a person) exists through the touch display 219. The robot 250 may move to a cell 1505 adjacent to the selected destination cell 1201. The robot 250 may perform a task transmitted from the electronic device 210 at the location of the cell 1505 adjacent to the moved destination cell 1201.

When the robot 250 is, for example, a retailbot, the retailbot may move to a cell 1505 adjacent to the destination cell 1201 at which the specific object (e.g., a person) exists to perform a task of greeting the specific object 1510 or inducing participation in an event.

When the robot 250 is, for example, a cleaner, the electronic device 210 may allow the cleaner to perform a task of cleaning by avoiding the specific object 1510 located at the destination cell 1201.

Referring to section [c] of FIG. 15, the electronic device 210 may receive a selection of the destination cell 1201 in which the specific objects 510 and 520 (e.g., the components of a washing machine) are stacked on the same cell or on the same coordinates, through the touch display 219. The robot 250 may move to the cell 1505 adjacent to the selected destination cell 1201. The robot 250 may recognize the stacked specific objects 510 and 520, respectively, using map information stored in the memory 263. The robot 250 may perform a task for each of the specific objects 510 and 520 at the location of the cell 1505 adjacent to the moved destination cell 1201.

When the robot 250 is, for example, a retailbot, the retailbot may move to the cell 1505 adjacent to the destination cell 1201 where the specific objects 510 and 520 (e.g., the components of a washing machine) exist, thereby performing a task such as product descriptions for the specific objects 510 and 520.

When the robot 250 is, for example, a cleaner, the electronic device 210 may allow the cleaner to perform a task of cleaning by avoiding the specific objects 510 and 520 located in the destination cell 1201.

Figure 16:
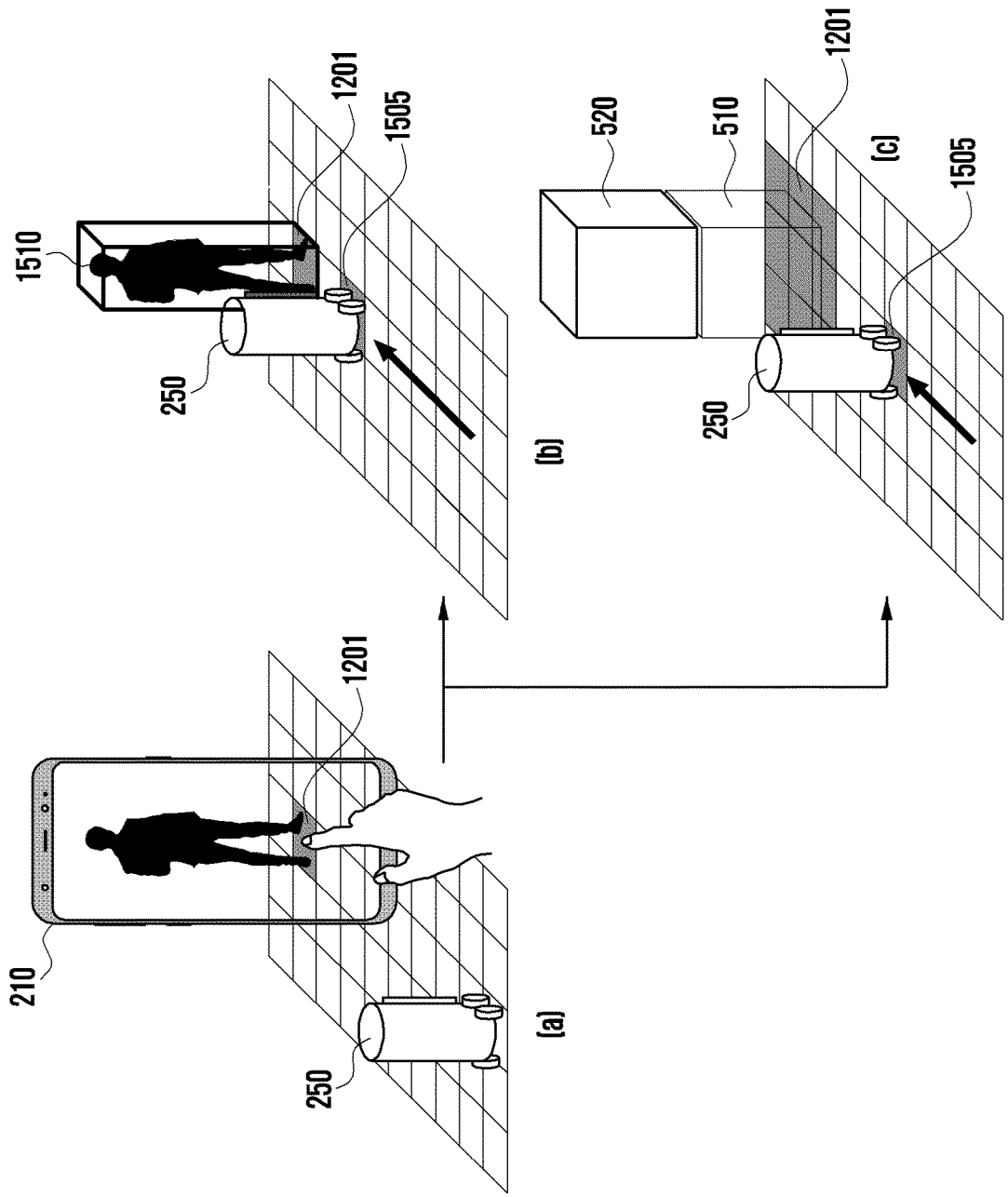
FIG. 16 illustrates a robot interacting with a specific object, according to an embodiment.

FIG. 16 illustrates a robot interacting with a specific object, according to an embodiment.

Referring to section [a] of FIG. 16, the electronic device 210 may receive a selection of the destination cell 1201 at which an object (e.g., the specific object 1510 (e.g., a person) or the specific objects 510 and 520) exists and a task through the touch display 219. The robot 250 may move to the cell 1505 adjacent to the selected destination cell 1201.

Referring to section [b] of FIG. 16, when the specific object 1510 exists in the destination cell 1201, the robot 250 may perform a task transmitted from the electronic device 210 at the location of the cell 1505 adjacent to the destination cell 1201.

The robot 250 may move up to the cell 1505 adjacent to the destination cell 1201 at which the specific object 1510 (e.g., the person) exists, thereby performing a task of greeting the specific object 1510 or inducing participation in an event. The robot 250 may detect at least one of the shape, eyes, nose, and mouth of the specific object 1510 (e.g., the person) using the sensing unit 255 and may identify the detected information as a person.

Referring to section [c] of FIG. 16, when the specific objects 510 and 520 (e.g., products such as the components of a washing machine) exist in the destination cell 1201, the robot 250 may perform a task transmitted from the electronic device 210 at the location of the cell 1505 adjacent to the destination cell 1201.

The robot 250 may move to the cell 1505 adjacent to the destination cell 1201 at which the specific objects 510 and 520 (e.g., products such as the components of a washing machine) exist, thereby performing a task such as product description for each of the specific objects 510 and 520. The robot 250 may use the map information stored in the memory 263 to identify whether the corresponding product is mapped.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device for controlling a robot, the electronic device comprising:
   a wireless communication unit;
   a camera;
   a touch display;
   a memory; and
   a processor operatively connected to the wireless communication unit, the camera, the touch display, and the memory,
   wherein the processor is configured to:
   recognize a marker of the robot photographed using the camera,
   generate a grid-shaped indicator of a space around the recognized robot with respect to coordinates at which the robot is located, wherein the grid-shaped indicator divides the space into a plurality of cells including a first cell where the robot is recognized to be located,
   generate, based on receiving a touch input on a second cell among the plurality of cells on the touch display, a virtual robot on the grid-shaped indicator,
   acquire location information for moving the robot from the first cell to the second cell,
   display a predicted movement path through which the robot is moved to a location corresponding to the acquired location information, and
   transmit the acquired location information to the robot to move the robot to the location corresponding to the acquired location information.

2. The electronic device of claim 1, wherein the processor is further configured to instruct the moved robot to perform a predetermined task on a specific object.

3. The electronic device of claim 1, wherein the location information comprises coordinate information.

4. The electronic device of claim 1, wherein the robot is a mobile robot and comprises at least one of a cleaner, an air cleaner, a drone, or a guide robot.

5. The electronic device of claim 1, wherein the indicator comprises an augmented reality (AR) matrix.

6. The electronic device of claim 2, wherein the processor is further configured to:
   receive location information of the robot from the electronic device through a server, and
   provide map information on the specific object to the electronic device or the robot.

7. The electronic device of claim 6, wherein the processor is further configured to cause the indicator to generate location information having absolute coordinates rather than relative coordinates as the map information on the specific object is received through the server.

8. The electronic device of claim 1, wherein the processor is further configured to generate a size and a direction of the indicator based on size and direction information of the recognized robot.

9. The electronic device of claim 1, wherein, as an angle of view of the camera is moved, the processor is further configured to generate an extension region of the indicator in a region corresponding to the moved angle of view of the camera.

10. The electronic device of claim 1, wherein the processor is further configured to:
    generate the indicator based on a photographed location of the marker photographed using the camera, or
    generate the indicator in a different form based on a recognized location of the marker photographed using the camera.

11. A method of an electronic device for controlling a robot, the method comprising:
    recognizing a marker of a robot photographed using a camera;
    generating a grid-shaped indicator of a space around the recognized robot with respect to coordinates at which the robot is located, wherein the grid-shaped indicator divides the space into a plurality of cells including a first cell where the robot is recognized to be located;
    generating, based on receiving a touch input on a second cell among the plurality of cells on the touch display, a virtual robot on the grid-shaped indicator;
    acquiring location information for moving the robot from the first cell to the second cell;
    displaying a predicted movement path through which the robot is moved to a location corresponding to the acquired location information; and moving the robot to the location corresponding to the acquired location information by transmitting the acquired location information to the robot.

12. The method of claim 11, further comprising instructing the moved robot to perform a predetermined task on a specific object.

13. The method of claim 11, wherein the indicator comprises an augmented reality (AR) matrix, and the location information comprises coordinate information.

14. The method of claim 12, further comprising:

receiving the location information of the robot from the electronic device through a server; and providing map information on the specific object to the electronic device or the robot by using the server.

15. The method of claim 11, further comprising generating a size and a direction of the indicator based on size and direction information of the recognized robot.

16. The method of claim 11, further comprising generating an extension region of the indicator, as an angle of view of the camera is moved, in a region corresponding to the moved angle of view of the camera.

17. The method of claim 11, wherein generating the indicator further comprises one of:

generating the indicator based on a photographed location of the marker photographed using the camera; or generating the indicator in a different form based on a recognized location of the marker photographed using the camera.

* * * * *